United States Patent
Mizuno et al.

(10) Patent No.: US 8,740,440 B2
(45) Date of Patent: Jun. 3, 2014

(54) PLANAR LIGHTING DEVICE

(75) Inventors: Hiroshi Mizuno, Nagoya (JP); Motohiro Aoki, Nagoya (JP)

(73) Assignee: Hayashi Engineering Inc., Aichi (JP)

( * ) Notice: Subject to any disclaimer, the term of this patent is extended or adjusted under 35 U.S.C. 154(b) by 92 days.

(21) Appl. No.: 13/594,062

(22) Filed: Aug. 24, 2012

(65) Prior Publication Data

US 2013/0051076 A1 Feb. 28, 2013

(30) Foreign Application Priority Data

Aug. 25, 2011 (JP) ................................. 2011-197632

(51) Int. Cl.
*F21V 7/04* (2006.01)

(52) U.S. Cl.
USPC ........... 362/613; 362/628; 362/615; 362/603; 362/611; 359/599

(58) Field of Classification Search
USPC ...................... 362/611, 613, 3, 628, 615, 606; 359/599, 431, 707
See application file for complete search history.

(56) References Cited

U.S. PATENT DOCUMENTS

| 2001/0012157 | A1 | 8/2001 | Suzuki et al. | |
| 2004/0130912 | A1* | 7/2004 | Miyashita | 362/561 |
| 2012/0020056 | A1* | 1/2012 | Yamagata et al. | 362/97.1 |
| 2013/0242614 | A1* | 9/2013 | Kurata et al. | 362/619 |
| 2013/0301295 | A1* | 11/2013 | Iwasaki | 362/609 |

FOREIGN PATENT DOCUMENTS

JP     2001-222905 A     8/2001

* cited by examiner

*Primary Examiner* — Ali Alavi
(74) *Attorney, Agent, or Firm* — Sughrue Mion, PLLC

(57) ABSTRACT

A light guide plate has a light guide plate body and at one side thereof a curvedly descending portion formed by curving front and rear surfaces of the light guide plate, with the surface to surface distance kept uniform, to a coaxial arcuate configuration so as to extend towards a direction of a rear surface of the light guide plate body. Spot light sources disposed in face to face relation with a free end face of the curvedly descending portion are arranged to be displaced towards the front surface of the light guide plate from a mid-center plane between the front and rear surfaces of the curvedly descending portion.

5 Claims, 4 Drawing Sheets

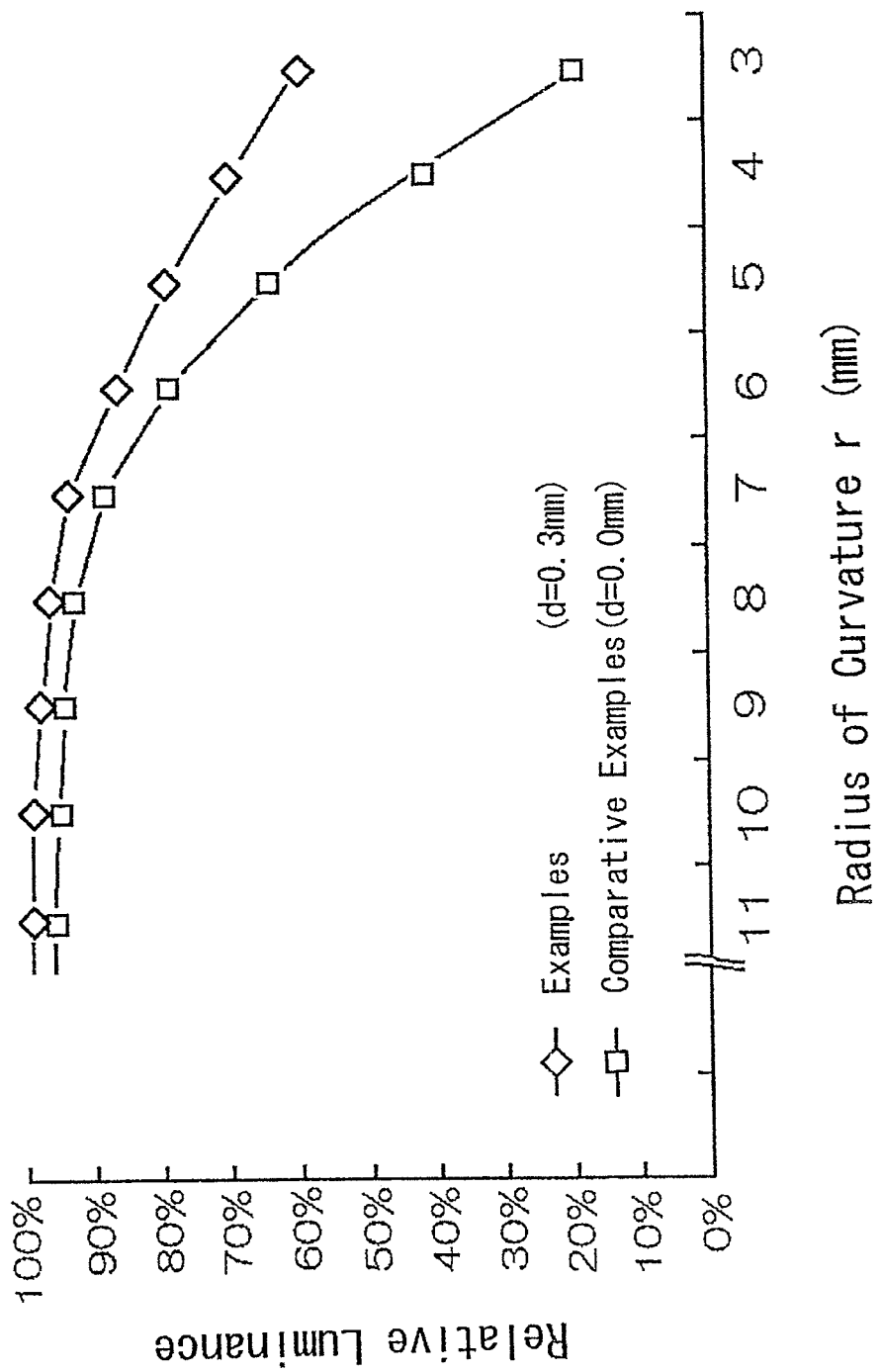

PLANAR LIGHTING DEVICE

CROSS REFERENCE TO THE RELATED APPLICATION

This application is based on and claims Convention priority to Japanese patent application No. 2011-197632, filed Aug. 25, 2011, the entire disclosure of which is herein incorporated by reference as a part of this application.

BACKGROUND OF THE INVENTION

1. Field of the Invention

The present invention relates to a planar lighting device of a kind having a light source disposed in a side edge of a light guide plate.

2. Description of Related Art

Planar lighting devices for providing a planar illumination have hitherto been made available in the market, of a structure, in which rays of light from a light source are introduced into a light guide plate of a flat plate configuration, having a predetermined surface area, and an object to be lighted such as, for example, a liquid crystal display device is illuminated in plane from rear. Of those planar lighting devices, a planar lighting device of a down lighting system, in which the light source is disposed rearwardly of the light guide plate, and the planar lighting device of a so-called side edge system, in which the light source is disposed in a side edge of the light guide plate, are particularly well known in the art.

Of them, the planar lighting device of the side edge system is particularly advantageous in that as compared with the planar lighting device of the down lighting system, the planar lighting device as a whole can have a reduced thickness and can be structured to exhibit a space saving.

On the other hand, with the planar lighting device of the side edge system there has been a problem in that a base dedicated for the light source is required and, also a space is required for installation of the light source and the base at a side portion of the light guide plate. As a result, downscaling of the planar lighting device in a widthwise direction tends to be hampered.

In order to alleviate the problem underlying the planar lighting device of the side edge system discussed above, the Japanese Laid-open Patent Publication No. 2001-222905 (Patent Document 1) suggests that the light source is disposed below the light guide plate and a portion of the light guide plate proximate to one side edge thereof is curved so as to confront the light source.

The structure of the component parts of the planar lighting device 110 includes, as shown in FIG. 4a, a transparent substrate 111, an electric wiring substrate (base) 115 and an elongated light source 118. The light source 118 has a light guide member 114 of an elongated shape disposed on the base 115, a spot light source 116 comprised of a light emitting diode (LED) and a reflecting member 113. One side end portion 112 of the transparent substrate 111 is bent to hang downwards so that rays of light from the light source 118 can be introduced into the planar substrate 111.

In the planar lighting device 110 so constructed as hereinabove, as shown in FIG. 4b, a sectional view, rays of light emitted from the spot light source 116 are introduced from one side end portion 112 into the transparent substrate 111 through the light guide plate 114 and propagate within the transparent substrate 111, while having repeated a diffused reflection, to illuminate in a plane. As such, there is no need to dispose the light source and the base dedicated for the light source at the side edge of the light guide plate, which has been the problem underlying the planar lighting device of the side edge system.

DISCLOSURE OF THE INVENTION

As a result of a series of studies conducted by the inventor of the present invention to further reduce a thickness of the prior art planer lighting device of the structure disclosed in the above mentioned Patent Document 1, it has been revealed that as mere reduction in thickness is carried out with neither alteration nor any modification made to the structure as disclosed in the Patent Document 1, leakage of the incident light from the light source increases considerably, thus posing a limitation to the propagation of the incident rays of light to the end of the light guide plate. Particularly in the vicinity of a bent portion of the light guide plate, a portion of light propagating within the light guide plate involves a component that impinges at an acute angle to leak out of the light guide body as shown by the arrows in FIG. 4b, making it difficult to assure that the rays of light can propagate to the end of the light guide plate.

In view of the foregoing, the present invention has for its essential object to provide a planar lighting device of a side edge system, which is, in view of the problems and inconveniences inherent in the prior art, so configured as to keep a high capability of propagating the rays of light to the end even though it has been low-profiled.

In order to resolves the underlying problems, the planar lighting device designed in accordance with the present invention includes a light guide plate having a plate body having front and rear surfaces and formed in a plate like configuration, and a curvedly descending portion of a light guide plate formed continuously with one side of the light guide plate body by curving in a coaxial arcuate shape so as to extend towards a direction of the rear surface of the plate body while a surface to surface distance is maintained uniform. The device further includes one or more spot light source or sources arranged in face to face relation with a free end face of the curvedly descending portion, in which the spot light source or sources is/are disposed having been displaced towards a direction of the front surface of the light guide plate from a mid-center plane between front and rear surfaces of the curvedly descending portion of the light guide plate. In addition, it has been ascertained through a series of experiments conducted that, where a portion of the light guide plate is curved to droop in a coaxial arcuate shape while the surface to surface distance is kept fixed to each other, the arrangement in which the spot light source or sources is/are disposed having been displaced towards the front surface side of the light guide plate from the mid-center plane of the surface to surface distance between the front and rear surfaces of the curvedly descending portion of the light guide plate is effective to enhance the rate of propagation to the end far away from the light source or sources of the light guide plate. This finding has led to the present invention.

In the present invention, at one side of the light guide plate body, it is curved and drooped in the coaxial arcuate configuration while the surface to surface distance enough to render the front and rear surface of the light guide plate to be parallel to each other is maintained uniform throughout the descending portion. By so doing, the angle of incidence of the incident light upon a wall surface of the light guide plate from the descending portion to a general portion approximates to parallel and the leakage of light can be reduced as small as possible. Also, since the spot light source or sources are displaced towards the front surface side of the light guide plate as hereinabove described, the light can be sufficiently propagated to the other side or the far end of the light guide plate.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 3 is a characteristic chart showing the result of measurement of luminance conducted on an example of the planar lighting device of the present invention and a comparative example;

DESCRIPTION OF PREFERRED EMBODIMENTS

A preferred embodiment of the present invention will now be described in detail with reference to the accompanying drawings.

Figure 1:
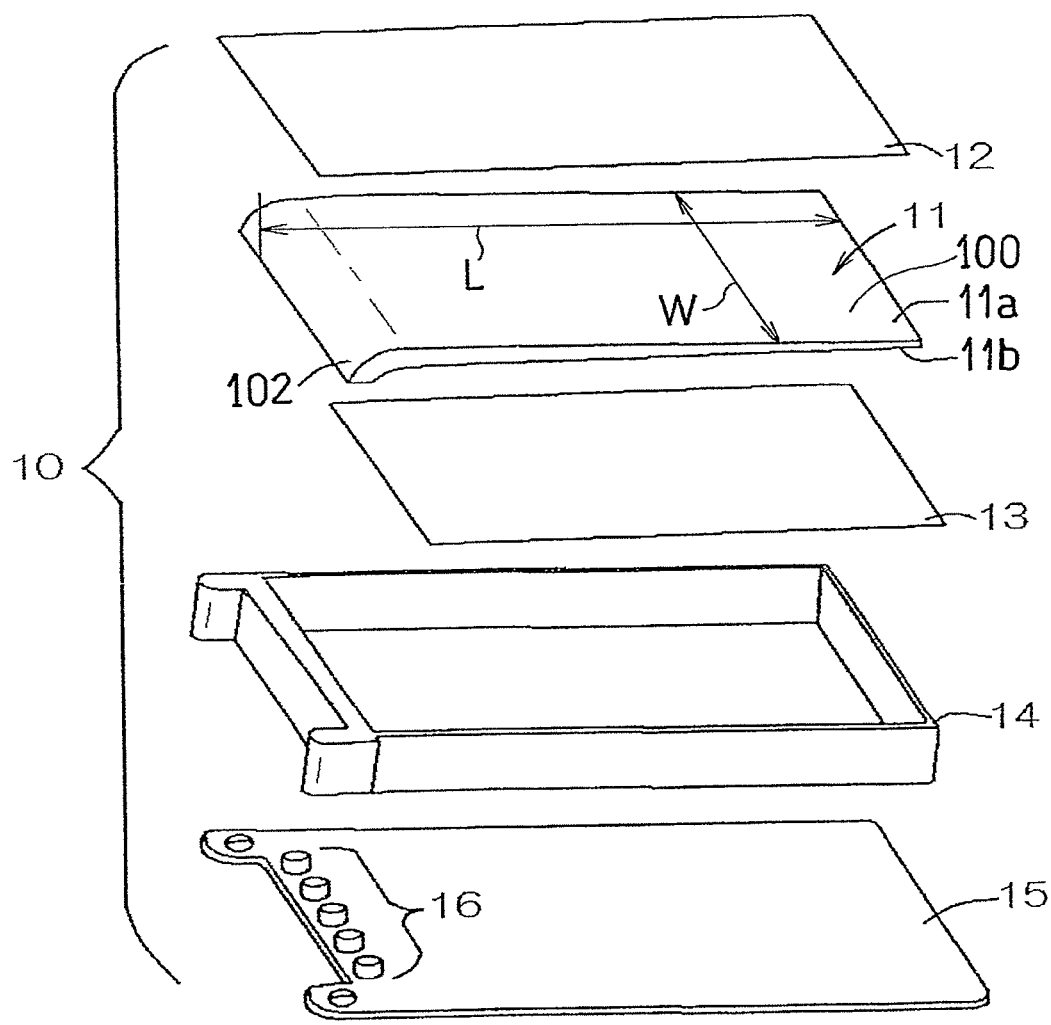
FIG. 1 is an exploded perspective view showing major structural members of a planar lighting device of the present invention.

FIG. 1 illustrates a planar lighting device designed in accordance with the preferred embodiment of the present invention, with major component parts shown in an exploded view. Those major components of the planar lighting device 10 of the present invention includes a light guide plate 11, a laminated sheet 12 comprised of a lens sheet and a diffusion sheet both placed one above the other on a front surface 11a side of the light guide plate 11, a reflecting sheet 13 laminated on a rear surface 11b side of the light guide plate body, and a rectangular frame 14 for accommodating and supporting the light guide plate 11 and the sheets 12 and 13 laminated on such light guide plate 11, as well as a base board 15 having a plurality of spot light sources 16 arranged beneath the frame 14.

Figure 2:
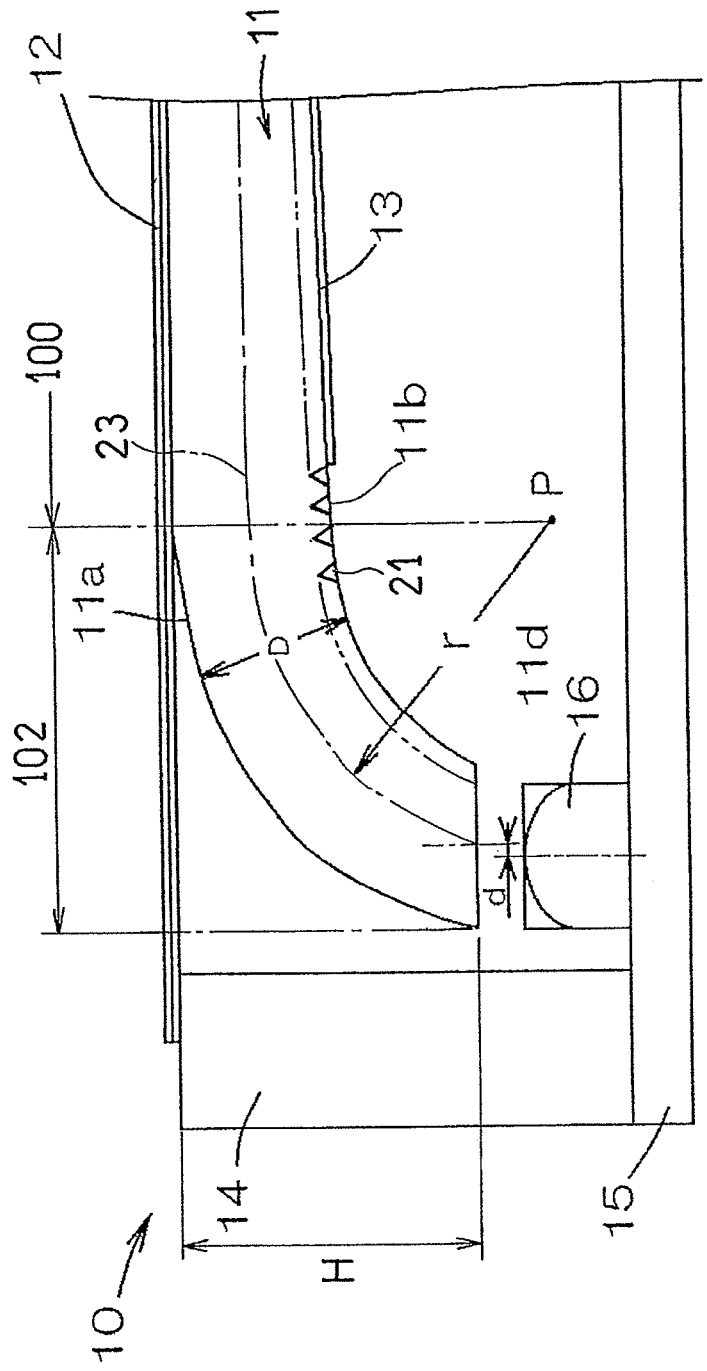
FIG. 2 is a longitudinal sectional view showing a main portion of the planar lighting device of the present invention.

The light guide plate 11 represents a rectangular flat plate shape having in its entirety a predetermined surface area (for example, 14×20 mm to 220×160 mm) and also having a plate body 100 formed substantially in a flat plate with first and second ends or sides opposite to each other. The light guide plate 11 has also a curvedly descending portion 102 formed in the first end or one side of the plate 100 so as to extend in a rear surface direction of the plate body (i.e., in a direction downwardly as viewed in FIG. 1). As shown in FIG. 2, the light guide plate 11, more specifically, the curvedly descending portion 102 has a free end or tip end face 11d confronting an array of the spot light sources 16. In the practice of the present invention, the distance H from the front surface 11a of the plate body 100 to the curvedly descending portion 102 measures a value equal to or smaller than 15 mm, thereby allowing the planar lighting device as a whole to have a reduced thickness.

Also, the thickness of the light guide plate 11, that is, the surface to surface distance D between the front and rear surfaces 11a and 11b measures a value equal to or smaller than 3 mm. In order to secure the uniformity of rays of light emitted, the surface to surface distance D measured at the curvedly descending portion 11b is chosen to be a value equal to or smaller than 3.0 mm, but the plate thickness of the plate body 100 is gradually reduced in a direction far away from the array of the spot light sources 16 so as to enable the plate body 100 to represent a substantially wedge shape.

The light guide plate 11 is made of a transparent material and is formed to a required shape by injection molding technique with the use of a matrix (polymethyl methacrylate resin, polystyrene resin or the like) of a kind having a property of propagating the incident light. At this time, the rear surface 11b side of the light guide plate body is formed with a reflecting structure 21 having a mechanical optical shape by uniformly applying a multiplicity of minute conical recesses, each having a predetermined vortex, to the rear surface 11b side of the light guide plate body, or applying a mold for forming the rear surface 11b side with minute non-perforated indentions at a predetermined pitch by means of a laser beam, or applying minute non-perforated indentions by means of an etching technique (all of those techniques being not shown).

In this case, regarding the incident light propagating within the light guide plate, as a result that a component of the incident light is reflected by the reflecting structure 21 having the recessed or non-perforated indention shape formed in the rear surface 11b side of the above described light guide plate 11 with the direction of propagation consequently deflected at an acute angle with respect to the rear surface 11b, the incident light, as it propagates, emerges outwardly from the front surface 11a of the light guide plate 11 to the outside of the light guide plate body. Accordingly, the emission of the light from the rear surface 11b is suppressed and the front surface 11a of the light guide plate 11 becomes a planar light source medium of the planar lighting device.

Also, as a different material for forming the light guide plate 11, it may be a scattering light guide body, in which 0.05 to 0.15 wt % of finely divided particles having a property of scattering rays of light (those of silicone resin, polystyrene crosslinking resin or the like having 2 to 3 μm in diameter) are dispersed in a matrix having a property of propagating the incident light (polymethyl methacrylate resin, polystyrene resin or the like). When the incident light from the array of the light sources 16 is introduced into the light guide plate 11, which is employed in the form of such a scattering light guide body, the incident light propagates within the light guide plate 11 in a predetermined direction away from the array of the light sources 16. In the course of the propagation, a component of the incident light then incident upon the finely divided particles is scattered with its direction having been changed and a portion thereof is emitted outwardly from the front surface 11a of the light guide plate 11 to the outside of the light guide plate body, thus making it possible to render the front surface 11a of the light guide plate body to be a planar light source medium for the planar lighting device.

It is adequate that in order to suppress the leakage of the incident light, the rear surface 11b of the light guide plate 11 has disposed thereon the reflecting sheet 13 and, on the other hand, in order to control the uniformity and the directivity of the light emitted from the front surface 11a of the light guide plate 11, the front surface 11a side has disposed thereon the laminated sheet 12, such as, for example, a lamination of the lens sheet and the diffusion sheet, for optical compensation purpose. These sheets 12 and 13 can be selected among what have been known in the art in connection with this kind of planar lighting device and/or an optical system member to suit to the particular purpose.

The frame 14 referred to above is so formed into a rectangular frame shape so that the light guide plate 11, the laminated sheet 12 for the optical compensation and the reflecting sheet 13 can be accommodated therein. The material of the frame 14 can be employed in the form of, for example, a resinous molding material or a metallic plate material.

The base board 15 referred to previously has on its upper surface, an electronic circuit (not shown) required for controlling the planar lighting device 10 of the present invention and, also, supports the array of the spot light sources 16 connected with this electronic circuit. Each of the spot light sources 16 is preferably employed in the form of a light emitting diode (LED), and those spot light sources 16 are suitably arranged at a position where they confront the free end face 11d of the descending portion 102 of the light guide plate 11, in a linear row in parallel relation to the free end face 11d. The number of the spot light sources 19 that are so arranged is suitably within the range of 1 to 4 per 10 mm. The base board 15 has a contour substantially similar to the contour of the frame 14, and with the base board 15 and the frame 14 combined together, the contour of the planar lighting device 10 is defined and a chamber for accommodating the various component parts is also defined.

Referring to FIG. 2, the structure present in the vicinity of the curvedly descending portion 102 of the light guide plate 11 will be described in detail.

FIG. 2 illustrates a sectional view of an important portion of the planar lighting device of the present invention in an assembled condition, and the free end face 11d of the curvedly descending portion 102 of the light guide plate 11 is shown as held in face to face relation with the array of the spot light sources 16. The curvedly descending portion 102 referred to above is so curved as to represent an arcuate shape with the front and rear surfaces 11a and 11b of the light guide plate curved about the same center point P while the front surface 11a and the rear surface 11b of the light guide plate 11 are held in parallel relation to each other with the surface to surface distance D maintained uniform throughout the curvedly descending portion 11c at a predetermined value (within the range of 0.4 to 3.0 mm).

The radius of curvature of the front and rear surfaces 11a and 11b representing their arcuate shapes coaxial relative to each other, that is, the radius of curvature r of a mid-center plane 23 between the front and rear surfaces 11a and 11b is suitably chosen to be within the range of 2.3 to 13.5 mm. If the radius of curvature r is greater than the above described uppermost limit, a problem will occur in the contour such as, for example, the increase of the thickness of the product to a value larger than necessary, but if the radius of curvature is smaller than the above described lowermost limit, a problem will equally occur that the loss of the incident light in the curvedly descending portion 102 will increase extremely.

While the free end face 11d of the curvedly descending portion 102 of the light guide 11 is held in fact to face relation to the array of the spot light source 16, the distance thereof is preferably as small as 1 mm in order to enhance the efficiency of utilization of the incident light.

As a result of studies conducted by the inventors of the present invention, it has been found desirable (the luminance can be uniformized) when the curvedly descending portion 102 employed in the practice of the present invention is of the shape as discussed above and the relative position of the array of the spot light sources 16 relative to the curvedly descending portion 102 is, as shown by the symbol d in FIG. 2, displaced a predetermined distance (within the range of 0.1 to 0.6 mm) from the mid-center plane 23, defined between the front and rear planes 11a and 11b of the curvedly descending portion 102 towards the front surface 11a side of the light guide plate.

Also, the function described above is remarkable if the radius of curvature r of the curvedly descending portion 102 is chosen to be as small as possible, and this enhances the reduction in thickness of the planar lighting device.

Under the following conditions, the planar lighting device as an example of the present invention was assembled and evaluated.

Example

Light Guide Plate

Using "Iupilon HL-4000", (manufactured and tradenamed by Mitsubishi Engineering-Plastic Corporation of Japan, as a material for the light guide plate body, the material was supplied to an injection molding machine to form the light guide plate of a predetermined shape under conditions of 240° C. in cylinder temperature, 80° C. in mold temperature and 180 ton in mold clamp pressure.

The light guide plate so manufactured was 55.0 mm in width W and 85.0 mm in length L, representing the wedge shaped sectional shape, when viewed in section taken in a direction lengthwise thereof, with the thickness thereof varying 3.0 mm to 1.0 mm in the lengthwise direction, in which one side or a thick side of the thickness (the surface to surface distance D) was curved towards the rear surface side to define the curvedly descending portion.

Samples having the respective curvedly descending portions of the radius of curvature varying by 1.0 mm within the range of 3.0 to 11.0 mm were prepared. At this time, regardless of the radius of curvature, the distance H from the front surface of each of the samples (light guide plate bodies) to the free end face of the associated curvedly descending portion was uniformly chosen to be 14.0 mm.

Also, as a "reference sample", the light guide plate having no curvedly descending portion was prepared.

It is to be noted that the minute conical recesses each having the vortex of 80° were uniformly formed on the rear surface 11b side of each of the prepared samples and, on this occasion, the cone represented by each minute conical recess was represented by 0.3 to 1.0 mm in diameter and 0.35 to 1.2 mm in depth.

Frame:

The frame was molded by the use of a white polycarbonate resin so shaped as to match with the contour of the light guide plate.

Spot Light Sources:

Six white LED elements, each tradenamed "NS2W064" and manufactured by Nichia Corporation of Japan, were arranged in a row with the neighboring LED elements spaced 0.8 mm from each other.

Here, the distance between the free end face of the curved descending portion of the light guide plate and each of the LED elements was chosen to be 0.5 mm and each of the LED elements had its center displaced 0.3 mm towards the front surface side of the light guide plate from the mid-center plane 23 between the front and rear surfaces of the curvedly descending portion of the light guide plate.

Laminated Sheet (Lens Sheet/Diffusion Sheet):

Two optical lens sheets, each tradenamed "BEF-2-T" and manufactured by Sumitomo 3-M Corporation of Japan, which were arranged with directions of prisms lying at right angles to each other, and a diffusion film, tradenamed "LSE 100" and manufactured by Kimoto Co., Ltd., of Japan and having the total light transmittance of 97.0%, HAZE value of 84.0% and 100 μm in thickness, were placed one above the other.

Reflecting Sheet:

Foamed polyester sheet, available from Tsujiden Co., Ltd., of Japan, 100 μm in thickness and 96.5% in reflectance, was employed.

Comparative Example

In this comparative example, the same component parts of the planar lighting device as those employed in Example of the present invention were employed, but only the positional relation between the array of the spot light sources and the curvedly descending portion of the light guide plate was changed and hence different from that in Example. Specifically, in the comparative example the center of each of the LED elements placed on the mid-center plane between the front and rear surfaces of the curvedly descending portion of the light guide plate. (Distance of displacement=0 mm)

(Method of Evaluation)

After the planar lighting devices referred to in Examples and Comparative Examples had been assembled, the luminance of the light emerging outwardly from the light emitting face of each of those planar lighting devices was measured.

For the measurement of luminance, a spectral luminance meter, tradenamed "CS-2000" and manufactured and sold by Konica Minolta Corporation of Japan, was used, and the average luminance (the value relative to that of the "reference sample") was measured at a center region of the light guide plate, specifically at a position spaced 350 mm from the light emitting face of each of the planar lighting devices and on a center line along the lengthwise direction.

(Results of Evaluation)

Results of evaluation on Example and Comparative Example are shown in FIG. 3.

As FIG. 3 makes it clear, Examples and Comparative Example have equally shown, that as the radius of curvature r of the coaxial arc of the curvedly descending portion decreases, the relative value of luminance relative to the "reference sample" decreases. However, Examples, in which the array of the spot light sources was offset the distance of displacement (d=0.3 mm) from the mid-center plane between the front and rear surfaces of the curvedly descending portion towards the front surface side of the light guide plate, have shown a little reduction in luminance as compared with that exhibited by Comparative Examples, in which no array of the spot light sources was offset. In order to avoid the reduction in luminance, the radius of curvature r is preferably of a value equal to or greater than 3 mm, more preferably 5 mm or greater and, still more preferably, 7 mm or greater.

As the results of the studies, the effect of the distance of displacement is significantly ascertained when d is 0.1 mm or more, and is maximized when d is about 0.3 mm, but when d=0.6 mm or more, the incident rate of the incident light from the array of the spot light sources onto the free end face of the curvedly descending portion decreases markedly and, therefore, no significant effects could be ascertained.

Figure 4A:
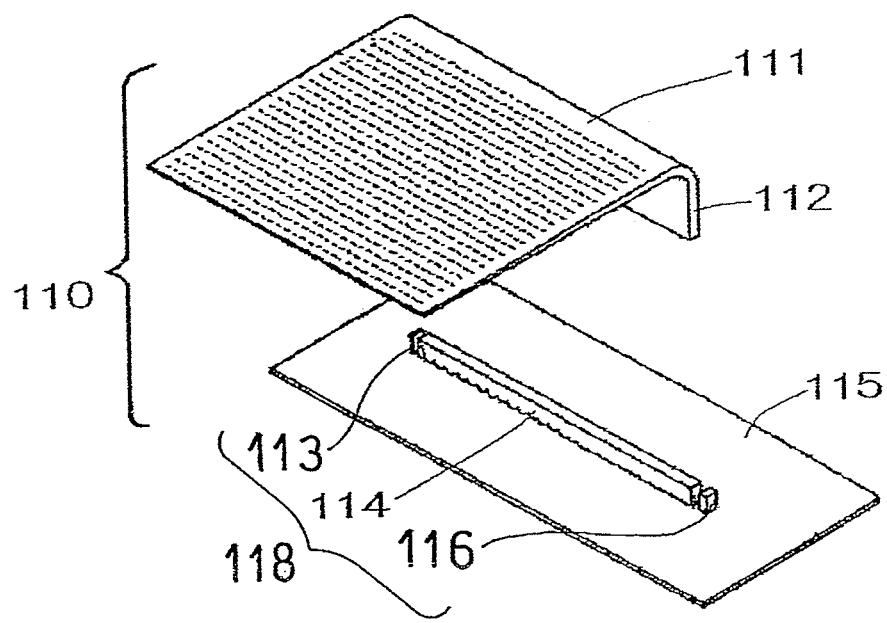
FIG. 4a is an exploded view showing the conventional device.
Figure 4B:
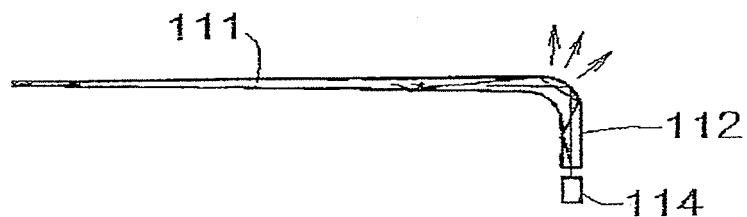
FIG. 4b is a side view showing a main portion of the conventional device.

According to the preferred embodiment of the present invention hereinbefore described, in the planar lighting device of the side edge system, in view of the problems inherent in the prior art shown in FIGS. 4a and 4b, the structure can be formed, in which even though it is thin-walled, a high capability of light propagation can be maintained.

INDUSTRIAL APPLICABILITY

Of the various planar lighting devices for illuminating in plane an object such as, for example, a liquid crystal display device from rear, the present invention can be suitably used to provide as the planar lighting device of the so-called side edge system, in which the light source is disposed in the side edge of the light guide plate.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

10 . . . Planar lighting device
11 . . . Light guide plate body
11a . . . Front surface
11b . . . Rear surface
11d . . . Free end face
12 . . . Laminated sheet (Lens sheet/Diffusion sheet)
13 . . . Reflecting sheet
14 . . . Frame
15 . . . Base board
16 . . . Spot light source
21 . . . Reflecting structure
100 . . . Plate body
102 . . . Curvedly descending portion
D . . . Surface to surface distance between front and rear surfaces of the curvedly descending portion
P . . . Center point
r . . . Radius of the coaxial arc of the curvedly descending portion
d . . . Distance of displacement

What is claimed is:

1. A planar lighting device comprising:
   a light guide plate having a plate body with front and rear surfaces and formed in a plate like configuration, and a curvedly descending portion of a light guide plate formed continuously with one side of the plate body by curving in a coaxial arcuate shape so as to extend towards a direction of the rear surface of the plate body while a surface to surface distance is maintained uniform; and
   one or more spot light source or sources arranged in face to face relation with a free end face of the curvedly descending portion;
   wherein the spot light source or sources is/are disposed having been displaced towards a direction of the front surface of the light guide plate from a mid-center plane between the front and rear surfaces of the curvedly descending portion of the light guide plate.

2. The planar lighting device as claimed in claim 1, in which the surface to surface distance D between the front and rear surfaces of the curvedly descending portion is equal to or smaller than 3.0 mm, the radius of curvature r of the coaxial arc of the curvedly descending portion is 3.0 mm or more and the distance of displacement d of the spot light source or sources from the mid-center plane between the front and rear planes of the curvedly descending portion is within the range of 1 to 0.6 mm.

3. The planar lighting device as claimed in claim 1, in which the light guide plate body has a varying surface to surface distance D between the front and rear surfaces, which distance D decreases from the curvedly descending portion to the opposite side.

4. The planar lighting device as claimed in claim 1, further comprising a reflecting structure formed in the rear surface of the light guide plate for suppressing light emerging outwardly from the rear surface.

5. The planar lighting device as claimed in claim 1, in which the plurality of the spot light sources are arranged in a linear row extending parallel to the free end face of the curved descending portion.

* * * * *